Feb. 14, 1967   TORU KARIKAWA ET AL   3,303,766
CAMERA SHUTTER ARRANGEMENT RESPONSIVE TO BOTH PHOTOELECTRIC
AND MECHANICAL TIME CONTROL SYSTEMS
Filed April 28, 1964

INVENTORS
TORU KARIKAWA
KIYOSHI ITO
NAOYUKI UNO
BY
Stanley Wolder

United States Patent Office 3,303,766
Patented Feb. 14, 1967

3,303,766
CAMERA SHUTTER ARRANGEMENT RESPONSIVE TO BOTH PHOTOELECTRIC AND MECHANICAL TIME CONTROL SYSTEMS
Toru Karikawa, Setagaya-ku, Tokyo-to, Kiyoshi Ito, Taito-ku, Tokyo-to, and Naoyuki Uno, Urawa-shi, Saitama-ken, Japan, assignors to Asahi Kogaku Kogyo Kabushiki Kaisha (English name) Asahi Optical Industry Co., Ltd., Tokyo-to, Japan, a corporation of Japan
Filed Apr. 28, 1964, Ser. No. 363,152
1 Claim. (Cl. 95—10)

A photoelectric time control shutter actuates an electromagnetic system through a timing circuit comprising capacitors, resistors, etc. and actuated on opening of the shutter by the output current of an photoelectric element which is exposed to the light rays coming from the object to be photographed, so that the time during which the shutter is open is controlled and proper exposure time is automatically maintained. With such shutter arrangement it is not necessary to set the shutter dial as practised with usual mechanically time controlling shutter arrangement utilizing cam action, spring urge, etc. so that operation of a photographic camera may be simplified in foolproof fashion.

In actual use of a photographic camera, according to the operator's intention or for the other reasons, it is sometimes necessary to freely select the exposure time without depending upon the automatic action and thereby a shutter functioning according to both photoelectric control and conventional mechanical free control is desired. In such dually controlled cameras, if the operator makes an erroneous operation by making photoelectric control shutter operation with the camera mechanism set to mechanical control condition, the camera will not operate properly because the operations according to the two systems interfere with each other.

The persent invention relates to a changeover arrangement between the photoelectric and the mechanical time control systems for eliminating the above indicated disadvantage. In this arrangement, the switch of the photoelectric time control circuit can be actuated by the shutter speed setting dial of the mechanical time control system, and the switch is closed with the mechanical time control system set to a condition which is in effect equivalent to B (bulb) exposure.

Figure 1:
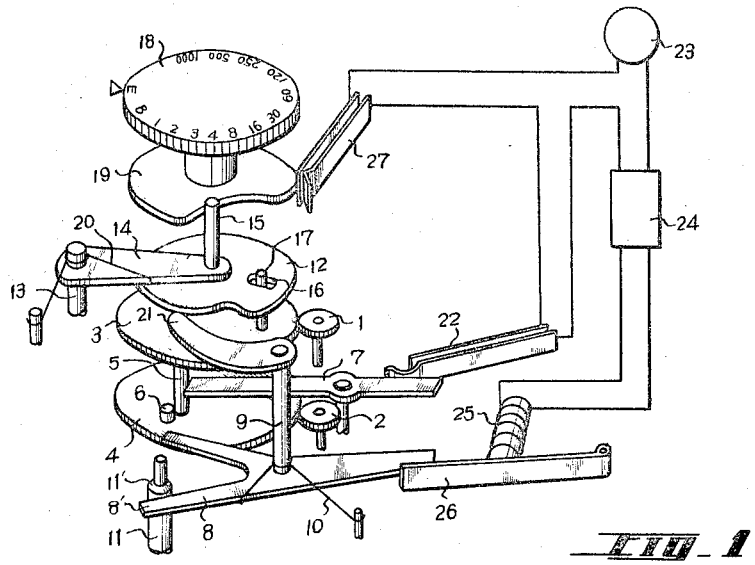
Figure 2:
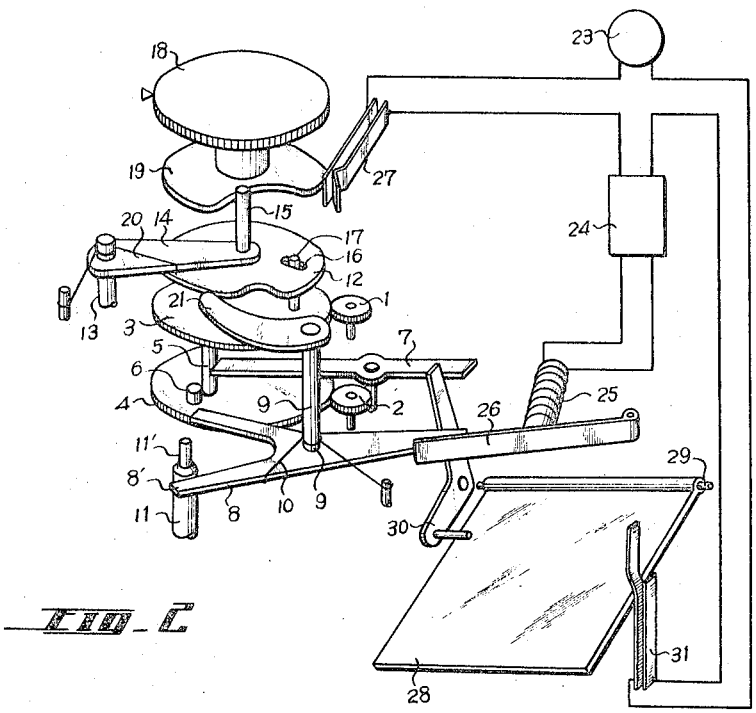

More detailed description of the structure and the operation of the practical embodiments of the present invention will be given herebelow in conjunction with the attached drawings in which:

FIG. 1 is a perspective view and a circuit diagram of the essential part of the shutter arrangement according to the present invention as applied to photographic focal plane shutter; and FIG. 2 is a perspective view showing the essential operating part of another embodiment of the present invention.

The drawings show an arrangement of the present invention as applied to a photographic focal plane shutter mechanism. Explaining the structure, especially the mechanical time control structure, there are shown a shutter leading screen shaft 1, a following screen shaft 2, a leading screen controlling gear 3 and a following screen controlling gear 4 which is coaxial with the gear 3. A clockwise rotation of the leading screen controlling gear 3 by an appropriate winding arrangement winds up the leading screen and, at the same time, the following screen through a pin 5 depending from the leading screen controlling gear 3 and engaging a pin 6 arranged on the following screen controlling gear 4 and thus transmitting the movement to the following screen controlling gear 4 until at the end of winding up the pin 5 engages a detent lever 7 and locked in the state. A following screen detent lever 8 is arranged on a shaft 9 in such a manner that in completely wound up position it will engage the pin 6 of the following screen controlling gear 4, the lever 8 being urged by a spring 10 so that it tends to approach the gear 4. One arm 8' of the Y-shaped lever 8 is normally in contact with the large diameter portion of a rod 11 associated with the shutter button so that the lever 8 is normally kept at an outwardly withdrawn position. A depression of the shutter button causes the rod to move down so that the lever 8 comes in contact with the small diameter portion of the rod 11 and accordingly the end of the lever 8 moves toward the pin 6.

A cam 12 is mounted on a shaft 15 at the end of an arm 14 arranged on a fixed shaft 13. A slot 16 of this cam engages a key pin 17 of the leading screen controlling gear 3 so that the cam 12 accompanies the gear 3 in its rotation. A shutter speed setting dial 18 is provided with a cam 19 at the lower part thereof, which cam 19 engages a shaft 15 of the cam 12 so that a rotation setting of the dial 18 causes moving adjustment of the cam 12 supported by the arm 14 against the action of a spring 20. A lever 21 fixed to the following screen detent lever 8 is in contact with the cam 12 by its end portion so that a rotation of the cam 12 will cause an excluding movement effect on the lever 21 and accordingly the fixed lever 8 moves outwardly and disengages the pin 6 of the following screen controlling gear 4 at the necessary moment. Further, the mechanism is so arranged that a depression of the rod 11 causes the detent lever 7 to swing in the direction of the arrow.

When the dial 18 is set to momentary exposure and the shutter button is depressed, the rod 11 moves down so that the arm 8' of the following screen detent lever 8 comes in contact with the small diameter portion of the rod 11 and the lever 8 advances to a position where it can engage the pin 6 and locks the following screen controlling gear 4. At the same time, by coupled movement the leading screen detent lever 7 disengages the pin 5 and permits the leading screen to run. In the next moment, the cam 12 accompanying the leading screen controlling gear 3 pushes the lever 21, and causes the following screen detent lever 8 fixed thereto to swing, thus disengaging the pin 6, freeing the following screen controlling gear 4 and permitting the following screen to run.

When the dial 18 is set to B (bulb) exposure, the cam 12 is spaced from the lever 21 by such distance that the swing of the cam 12 after the run of the leading screen cannot disengage the lever 8 from the pin 6. In this case, on releasing the shutter button the tapered portion 11' of the upwardly moving rod 11 causes the detent lever 8 to swing outward, thus disengaging same from the pin 6 and permitting the following screen to run.

The foregoing is an explanation of the mechanical time control shutter. Now the following is an explanation of the photoelectric time control system. Shown further in the drawing area switch 22 which is closed by being pushed by the leading screen detent lever 7 when it is released, a photoelectric element 23 which receives the light rays from the object to be photographed, a timing circuit 24 connected to the output circuit of the photoelectric element 23, an electromagnet 25 connected to the timing circuit 24, an electromagnetic release lever 26 which is so arranged that on being attracted by the actuated electromagnet 25 it pushes the following screen detent lever 8 and disengages the pin 6 of the following screen controlling gear 4. Simultaneously with the start of the run of the leading screen by release of the leading screen detent lever 7, closing of the switch 22 actuates the timing circuit 24 which, after the necessary lapse of time, actuates the electromagnetic arrangement 25, 26 by its output, disengaging the detent lever 8 from the following screen controlling gear 3 and causing the following screen to run.

In the present invention, in addition to usual B (bulb) exposure setting with scale indication B on the speed setting dial 18, the mechanical time control system is provided with a further setting position which is in effect equivalent to this B (bulb) exposure and is indicated on the dial 18 by a sign E, for example. A switch 27 is provided which is so arranged as to be closed through the cam 19 when the dial 18 is set to the point E. This switch 27 is inserted in the output circuit of the photoelectric element so that the photoelectric time control system is actuated only when this switch is closed. According to this arrangement, on depressing the shutter button with the dial 18 set to the point E, instead of the operation with the mechanical time control system only whereafter the the run of the leading screen release of the shutter button causes upward movement of the rod 11 and only then the following screen runs, the photoelectric system operates and automatic momentary exposure is carried out prior to and irrespective of release of the shutter button.

In FIG. 2 there is shown another embodiment of the present invention in which the upward swinging movement of the mirror of a single lens reflex camera is utilized to close the switch of the photoelectric time control shutter.

In FIGS. 1 and 2 the two corresponding parts performing the same function are indicated by the same reference numeral. Further shown in FIG. 2 are a mirror 28 swingably supported by a shaft 29 and so arranged that on downward movement of the rod 11 it is disengaged and swings up from the downmost oblique position, an intermediate lever 30 which swings by being pushed by the upwardly swinging mirror 28 and thereby disengages the leading screen detent lever 7 from the leading screen controlling gear 3, and a switch 31 consisting of two opposite contact pieces and being so arranged as to be closed on upward swing of the mirror 28, one of the contact pieces being pressed by the side of the moving mirror and thus brought into contact with the other.

Now, the mechanical time control operation of this arrangement is as follows: On depressing the shutter button and causing the rod 11 to move downward, as is the case with the arrangement of FIG. 1, the lever 8 advances to a position where it engages the pin 6 and locks the following screen controlling gear 4 and at the same time the downward movement of the rod 11 releases in the known manner the mirror 28 in its oblique downmost position, which mirror 28 swings up in a moment by the upward urge and causes the intermediate lever 30 to swing in clockwise direction, causing the leading screen detent lever 7 to swing in counterclockwise direction. Thereafter the arrangement operates in just the same way as the arrangement of FIG. 1 and thus the mechanical time control shutter operation is performed.

In photoelectric time control operation system of this arrangement, instead of the photoelectric circuit switch 22 arranged in the swing range of the detent lever 7 of the arrangement according to FIG. 1, the switch 31 arranged in the upward swing range of the mirror 28 is used to close the photoelectric circuit. Its operation is just the same as the arrangement of FIG. 1 except that the switch 31 is closed by the action of the mirror 28 which is carried out prior to the run of the leading screen.

In the operation of an electromagnetic system connected to a photoelectric time control circuit, there is a possibility that some time lag is caused due to the reactance of the circuit and the movement process of the moving pieces. According to the above mentioned structure in which the timing circuit is closed by the upward swing movement of the mirror, the circuit closure precedes the opening of shutter by a definite time. Accordingly, by properly adjusting the circuit closing time said time lag of the electromagnetic system can be compensated and a proper time control can be performed and thus the arrangement advantageously operates as a photoelectric time control shutter.

The above are only examples that can be realized ac- according to the conception of the present invention and accordingly other applications or modifications of design can of course be made without departing from the spirit of the present invention.

What is claimed is:

A photographic camera comprising shutter means successively movable to open and closed positions defining an exposure sequence and including leading and trailing shutter screens and drive means therefor, means for releasably locking said leading shutter screen in a retracted position, means for releasably locking said trailing shutter screen in a retracted position, a first manually adjustable timing means for effecting the closure of said shutter means a preselected interval following the opening thereof and including means for releasing said trailing shutter screen locking means said preselected interval following the release of said leading shutter screen locking means, a second, light responsive timing means including a photosensitive element for automatically effecting the closure of said shutter means an interval following the opening thereof responsive to the light incident on said photosensitive element and including a solenoid actuated member actuatable upon energization of said solenoid to release said trailing shutter screen locking means an interval following the release of said leading shutter screen locking means responsive to the light incident on said photosensitive element, selector means for alternatively actuating said first and second timing means and simultaneously deactuating said second and first timing means respectively, a mirror movable between an advanced and a retracted position, and means responsive to the retraction of said mirror for releasing said leading shutter screen, said second timing means including a timing initiating switch actuated in response to said movement of said mirror to said retracted position.

References Cited by the Examiner

UNITED STATES PATENTS

| 2,550,698 | 5/1951 | King | 95—42 |
| 2,890,640 | 6/1959 | Noack | 95—63 |
| 2,985,082 | 5/1961 | Starp | 95—10 |
| 3,004,482 | 10/1961 | Muller | 95—42 X |
| 3,200,723 | 8/1965 | Topaz | 95—10 |

JOHN M. HORAN, *Primary Examiner.*